May 23, 1972 H. VERDIER 3,664,708

WHEEL ASSEMBLY

Filed June 2, 1970

INVENTOR.
HENRI VERDIER
BY
Brumbaugh, Graves, Donohue & Raymond
his ATTORNEYS

United States Patent Office
3,664,708
Patented May 23, 1972

3,664,708
WHEEL ASSEMBLY
Henri Verdier, Beauregard-l'Eveque, France, assignor to Compagnie Generale des Etablissement Michelin raison sociale Michelin & Cie, Clermont-Ferrand, Puy-de-Dome, France
Filed June 2, 1970, Ser. No. 42,839
Claims priority, application France, June 6, 1969, 6918894
Int. Cl. B60b 3/16
U.S. Cl. 301—9 DN
3 Claims

ABSTRACT OF THE DISCLOSURE

A casing or sleeve fits over a stud on the hub of the wheel of an automotive vehicle and through a hole formed in a dished portion of the wheel disk which projects in relation to the part of the disk that contacts the hub. A nut screwed onto the stud crimps the casing to the disk. The casing extends to a location near the hub but ordinarily does not touch the hub. When the nut is tightened to a certain point, thereby deforming the disk to some extent, the casing abuts the hub, preventing further deformation of the disk.

BACKGROUND OF THE INVENTION

This invention relates to wheels for automotive vehicles and, more particularly, to novel and highly effective means for attaching such wheels to their hubs.

In one currently employed type of attachment, the wheel disk rests on the hub along a ring-shaped surface. The tight holding of the disk against the hub is ensured by means of studs forming one piece with the hub passing through the disk, on which are screwed nuts. The fixing nuts rest against the disk at the periphery of holes arranged on the bottom of dished portions which project in relation to that part of the disk which is in contact with the hub. When the nuts are threaded on, an elastic compression of the disk occurs all around the holes, and thus the pressure exerted by the disk is uniformly distributed over the entire surface of contact with the hub. In this way, there is avoided any concentration of stresses in the immediate vicinity of the attachment holes, which would be produced if the metal immediately surrounding the attachment holes were to come into direct contact with the hub.

One disadvantage of this system, however, is that if the nuts are locked too tightly, the projecting metal forming the periphery of the fixing holes is crushed. This danger is especially great if the sheet metal used to produce the disk is too thin and thus does not have sufficient resistance to crushing. In order to reduce this danger of crushing as well as a concentration of stresses in the vicinity of the holes, one is led to employ metal of greater thickness, exceeding the thickness needed to impart to the disk and to the wheel sufficient strength and resistance to fatigue.

SUMMARY OF THE INVENTION

An object of the invention is to eliminate both the danger of crushing of projecting portions of a disk formed with holes for attachment and the need to increase the thickness of the disk beyond that which would be otherwise necessary.

The foregoing and other objects are attained in accordance with the invention by the provision of a wheel comprising a disk formed with projecting portions traversed by holes for attachment to the hub, characterized in that each hole is fitted with a casing extending in the direction of the hub and forming a stop or abutment limiting the maximum deformation due to the locking stress.

The wheel in accordance with the invention preferably includes the following features:

(a) The material of the casing, measured in a radial direction, is thinner on the disk than on the hub side.

(b) The portion of the casing of lesser radial thickness is crimped or set on the disk all around the holes, so that the disk bears on a shoulder formed between the portion of the casing of lesser radial thickness and the portion of the casing of greater radial thickness.

(c) The height of the casing, i.e. its axial dimension, is such that, when the casing is in place, there normally remains a small clearance between the base of the casing on the hub side and the plane of attachment of the hub to the disk.

(d) The inner surface of the casing is cylindrical so as to facilitate the proper facing of the wheel on the hub and to prevent the weight of the wheel from bearing down unduly on any one of the threads provided on the attachment studs, as occurs in conventional devices.

The use of casings in accordance with the invention reinforces the periphery of the holes perforating the disk and makes it possible to limit the crushing of this area without the loss of the elasticity of the metal around the holes. Thus, wheels can be made lighter while the grave disadvantage of too forceful locking need not be feared.

BRIEF DESCRIPTION OF THE DRAWING

Additional aspects of the invention will be understood from the following detailed description of a representative embodiment thereof, in conjunction with the attached drawing, wherein.

DESCRIPTION OF THE PREFERRED EMBODIMENTS

Figure 1:
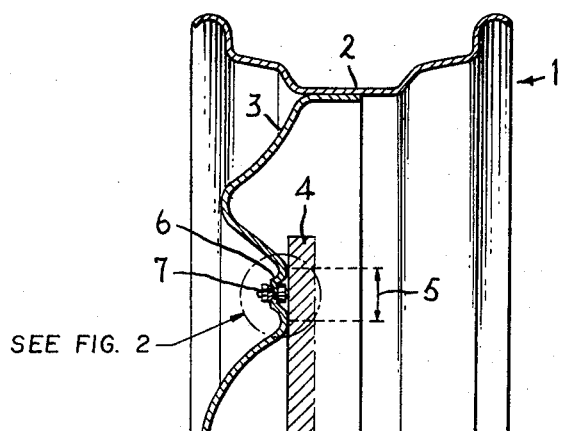
FIG. 1 represents a wheel in radial half-section through a plane passing through the axis of an attachment hole.

FIG. 1 shows a wheel 1; comprising a rim 2 and a disk 3. The latter is applied against a hub 4 along a ring-shaped zone 5. Within this zone there are a number of projecting elements 6 each traversed by a hole 7.

Figure 2:
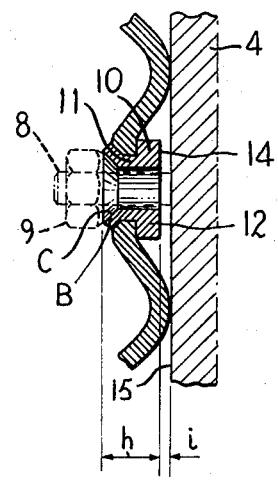
FIG. 2 represents on a larger scale the portion circled in FIG. 1, and shows the manner in which the wheel is secured to the hub in accordance with the invention.

As may be seen in FIG. 2, a casing 10 is mounted in the hole 7. This casing has an interior diameter sufficient to enable a stud 8 forming one piece with the hub to pass through. The casing 10 comprises a portion 11 which is in contact with the disk. It is comparatively thin and its shape is that of a cylinder followed by a truncated cone c, and it supports the customary locking nut 9 resting against it, the angle of opening of the truncated cone c corresponding to the shape of the bearing surface B of the nut. The casing 10 moreover comprises a zone of greater thickness 12. The disk bears against a shoulder 13 (FIG. 3) formed by the increase in diameter of the portion 12. The height h of the casing is such that it leaves a clearance i between the base 14 of the casing and the plane of attachment 15 common to the hub 4 and the ring-shaped zone 5 of the disk.

Figure 3:
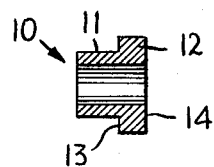
FIG. 3 represents on the same scale as FIG. 2 and in cross section a casing in accordance with the invention prior to setting.

FIG. 3 shows the casing prior to setting. It consists of two cylindrical portions 11 and 12. Setting reduces the axial height of the portion 11, which is thinner than the portion 12. In order to facilitate the setting, the casing 10 is preferably made of medium hard steel.

It is within the scope of the invention to give the casing a different shape, and especially to have it fill the cavity between the disk and the hub, provided, however, that it does not come into contact with the hub prior to locking. During locking, when the nut is tightened to a certain point, the base 14 abuts the hub, preventing further deformation of the disk, which would be dangerous. Once crimped into place, the casing stays with the disk, and the nut can be removed in the usual manner to enable removal of the wheel.

As stated above, the casings in accordance with the invention have the additional advantage of facilitating the the mounting of the wheel. The disk with casings bears against the studs over a much larger surface than does a disk without casings and by itself assumes prior to locking of the nuts a position parallel to the plane of the hub.

Many modifications of the representative embodiment of the invention disclosed herein will occur to those skilled in the art upon a reading of this specification. The invention is to be construed as including all such modifications as fall within the scope of the appended claims.

I claim:

1. In a wheel comprising a wheel disk formed with a plurality of projecting elements each formed with a hole through which studs pass and around which an axial tightening force is applied for securing the wheel on a hub, the improvement comprising a casing operatively associated with each of said holes, each casing comprising a thin portion formed with a wall that is relatively thin, measured in a radial direction, and a thicker portion contiguous with said thin portion and formed with a wall that is thicker, measured in a radial direction, the thin portion of each casing passing through the hole associated therewith and the thicker portion of each casing terminating axially inwardly in a flat surface between the associated projecting element and said hub, said flat surface being parallel to the opposed hub surface, the axial height of said projecting elements being sufficiently great as compared to the axial height of said casings to have a space between said flat surface of each casing and said hub upon application of a small initial tightening force and said space being sufficiently small that, upon application of the desired final tightening force, the flat surface of each casing abuts said hub and the thin portion of each casing is permanently crimped over the opening associated therewith, whereby sufficient deformation of said disk to achieve a secure locking of said disk on said hub is assured and excessive deformation of said disk is prevented.

2. A wheel according to claim 1 wherein said thin and thicker portions of each casing define an annular exterior shoulder where they meet, said shoulder abutting the inside of the associated projecting element after the crimping of the associated thin portion.

3. A wheel according to claim 1 wherein each of the casings is formed with an inside cylindrical surface that bears on the stud during the mounting of the wheel.

References Cited
UNITED STATES PATENTS

| | | | |
|---|---|---|---|
| 1,928,068 | 9/1933 | Michelin | 301—9 DN |
| 3,366,421 | 1/1968 | Bradley | 301—9 DN |

FOREIGN PATENTS

| | | | |
|---|---|---|---|
| 619,575 | 1/1927 | France | 301—63 |
| 839,409 | 1/1939 | France | 301—9 DN |
| 504,916 | 8/1930 | Germany | 301—9 DN |

RICHARD J. JOHNSON, Primary Examiner